July 10, 1956
C. C. NELSON
2,754,075
CHRISTMAS TREE HOLDER
Filed March 23, 1954
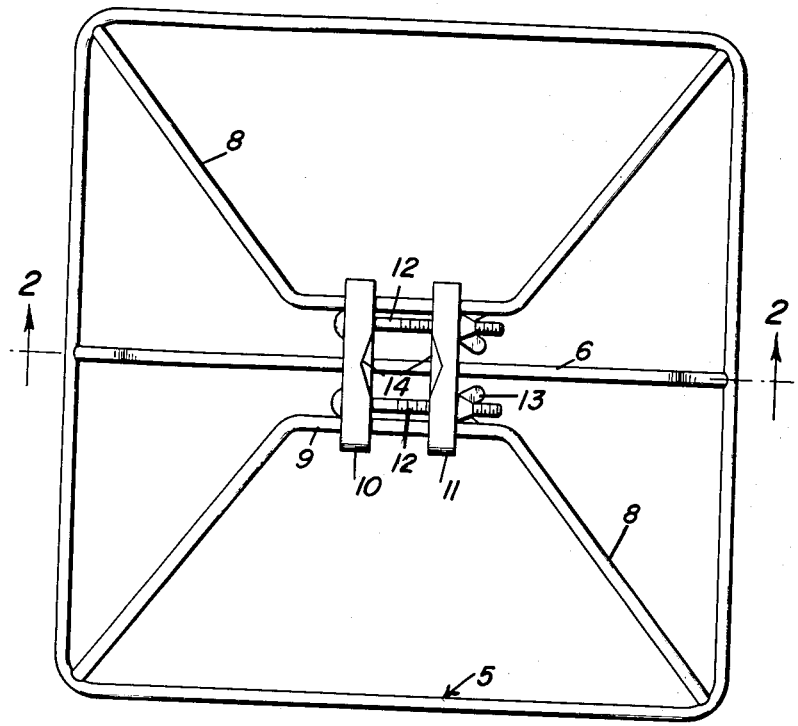
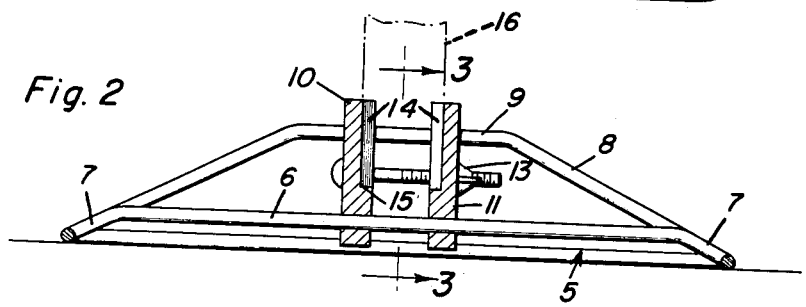
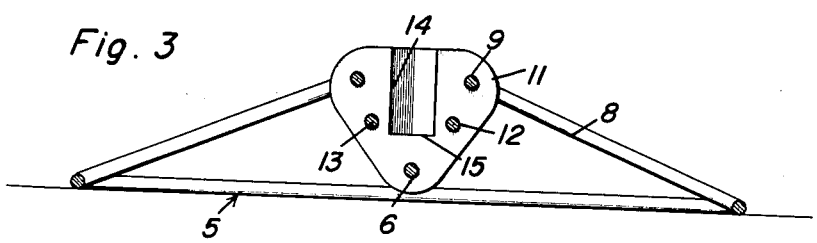
Carl C. Nelson
INVENTOR.
BY Clarence A. O'Brien
and Harvey B. Jacobson
Attorneys United States Patent Office 2,754,075
Patented July 10, 1956

2,754,075
CHRISTMAS TREE HOLDER
Carl C. Nelson, Los Angeles, Calif.
Application March 23, 1954, Serial No. 418,081
2 Claims. (Cl. 248—44)

The present invention relates to new and useful improvements in holders for Christmas trees or other upright members and more particularly to a novel clamping means for the trunk of the tree.

An important object of the present invention is to provide a clamping device for Christmas tree holders which is adjustable to accommodate tree trunks of various diameters and also in which the clamping device is adjustable on a supporting base in order to properly position and balance the tree thereon.

A further object is to provide a device of this character of simple and practical construction, which is strong and durable, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a sectional view taken on a line 2—2 of Figure 1, and

Figure 3 is a vertical sectional view taken on a line 3—3 of Figure 2.

Referring now to the drawing in detail wherein for the purpose of illustration I have disclosed a preferred embodiment of the invention the numeral 5 designates a base generally which is constructed of a continuous rigid wire frame of preferably square shape and having two of its parallel sides connected by a cross brace 6 which has its ends inclined upwardly as shown at 7 to elevate the brace above the horizontal plate of the base.

Extending inwardly from the corners of the frame 5 are a pair of U-shaped clamp supports 8 having their ends welded or otherwise suitably secured at the corners of the frame and inclined upwardly and inwardly toward the center of the frame. The bight portion 9 of the U-shaped supports 8 are positioned in spaced parallel relation with respect to each other.

A pair of clamping plates 10 and 11 of preferably triangular shape have their lower ends mounted on the brace rod 6 and have their upper portions mounted on the parallel bight portions 9 of the braces 8.

A pair of bolts 12 connect the plates 10 and 11 to each other and are provided with wing nuts 13 for clamping the plates relative to each other.

The opposed faces of the plates 10 and 11 are formed with vertical recesses 14 in their upper portions with shoulders 15 at the lower ends of the recesses.

In the operation of the device the trunk 16 of a Christmas tree or other upright member is positioned in the recesses 14 with the lower end of the trunk resting on the shoulders 15 and the wing nuts 13 are then tightened to clamp the plates 10 and 11 against the opposite sides of the tree to securely hold the trunk in an upright position.

The plate 10 is preferably fixed to the supports 8 while the plate 11 is slidable on the supports.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What is claimed as new is as follows:

1. A holder of the class described comprising a rectangular open base frame, a horizontal center brace extending across and fixed to said frame, a pair of rods on said frame rising from corners thereof with laterally spaced horizontal center portions parallel to said brace and above and at opposite sides of the same, a pair of upright clamping plates each mounted on both said brace and center portions and held upright thereby, one clamping plate being horizontally slidable on said brace and center portions relative to the other plate for clampingly engaging said plates with opposite sides of a tree trunk, said plates having a pair of vertical confronting grooves therein for receiving a tree trunk to hold the same upright, and bolts extending through the clamping plates with nuts thereon for turning against said one plate to slide the same.

2. A holder as in claim 1, said brace having ends inclining upwardly from said frame to space a portion of the brace intermediate said ends above said frame, said plates being mounted on said portions for spacing thereby above a floor on which said frame is disposed.

References Cited in the file of this patent

UNITED STATES PATENTS

| 909,634 | Mitchell | Jan. 12, 1907 |
| 1,165,360 | Pangborn | Dec. 21, 1915 |
| 1,761,752 | Scott | June 3, 1930 |
| 2,448,304 | Gabel | Aug. 31, 1948 |
| 2,556,460 | Ballam et al. | June 12, 1951 |
| 2,634,070 | Aguettaz | Apr. 7, 1953 |